United States Patent [19]

Everest et al.

[11] Patent Number: 4,759,629
[45] Date of Patent: Jul. 26, 1988

[54] FIBER OPTIC GYROSCOPES

[75] Inventors: Frank G. Everest; Christopher J. Kay, both of Stevenage, United Kingdom

[73] Assignee: British Aerospace Public Limited Company, London, England

[21] Appl. No.: 47,124

[22] Filed: May 8, 1987

[30] Foreign Application Priority Data

May 8, 1986 [GB] United Kingdom ................ 8611394

[51] Int. Cl.$^4$ ........................ G01B 9/02; G01C 19/64
[52] U.S. Cl. .................................................... 356/350
[58] Field of Search .......................................... 356/350

[56] References Cited

U.S. PATENT DOCUMENTS 4,299,490 11/1981 Cahill et al. .......................... 356/350

FOREIGN PATENT DOCUMENTS 2157425 10/1985 United Kingdom ................ 356/350
2162937 2/1986 United Kingdom ................ 356/350

Primary Examiner—Vincent P. McGraw
Attorney, Agent, or Firm—Cushman, Darby & Cushman

[57] ABSTRACT

The gyroscope disclosed herein provides a simple and effective method of measuring the length of the fiber in a fiber optic interferometer, and using this length to correct the output of the interferometer.

2 Claims, 3 Drawing Sheets

FIBER OPTIC GYROSCOPES

This invention relates to fibre optic gyroscopes.

In a fibre optic gyroscope light is split into two components, and launched into each end of a coil of optical fibre to prepagate in opposed directions around the coil. After having passed through the coil, the components are recombined to form an interference fringe at a detector. If the coil is rotated about its axis, a non-reciprocal phase shift known as the Sagnac phase shift is induced between the clockwise and anti clockwise beams thus causing a shift in the fringe pattern. The magnitude and direction of the fringshift is proportional to the rate and sense of the rotation applied to the coil about its axis. In the phase-nulling fibre optic gyroscope the output from the detector is processed to derive a further non-reciprocal phase shift which is interjected on the component beams in the coil to compensate the Sagnac phase shift thereby to null any fringe shift. The further non-reciprocal phase shift may be applied by means of an acousto-optic frequency modulator located at one end of the coil thus shifting the frequency of one component prior to entering the coil and shifting the frequency of the other component once it has left the coil. In the serrodyne gyroscope a phase modulator is driven with a linear ramp to produce a frequency shift in the light passing through the phase modulator.

In the phase-nulling fibre optic gyroscope the non-reciprocal frequency shift (f) required to null the fringe shift induced by rotation of the coil is related to the rotation (W) by the following relationship:

$$f = S.W$$

where S is the scale factor.

The scale factor S is sensitive to changes in length of the fibre in the coil and the importance of stabilising the scale factor against such changes is discussed in our published U.K. Patent Application Nos. 2157425A and 2162937.

In most gyroscopes, a bias dither is introduced between the clockwise and counter clockwise beams so to introduce a bias of $\pm Pi/2$ between the beams thereby to make the gyroscope operate at the most sensitive part of the intensity versus relative phase curve; this may be achieved by means of a phase modulator switched alternately to $+Pi/4$ and $-Pi/4$ and having a switching interval synchronised with the time taken for a beam of light to propagate around the coil.

It is an aim of this invention to provide a simple and effective measure and correction for the length of the fibre in a fibre optic interferometer. It is a further aim of the invention to stabilise the scale factor of fibre optic interferometers.

According to the present invention there is provided a fibre optic gyroscope including:

a length of optical fibre, a light source for being divided into a least two component beams for being propagated in opposed directions through said fibre, means for re-combining said component beams to form an output optical beam when said component beams have left the optical fibre, detector means for detecting said output optical beam and producing a signal indicative of the intensity thereof, phase modulating means for applying a switched phase modulation in the optical fibre path of alternating periods, means for comparing the detector output signal with a signal representative of said phase modulation and for adjusting said phase modulating means to synchronise the phase modulation with the propagation time of light along said length of optical fibre.

When the sensor is at rest and the phase modulation means is operating with a half period equivalent to the propagation time then the intensity detected by the detector will remain at a constant amplitude. When however the half period is greater than or less than the propagation time the intensity detected will have large amplitude pulses corresponding to maximum constructive interference of the two component beams at twice the frequency of the phase modulation means. The timing of these transients relative to the output of the phase modulation means indicates whether the frequency of the phase modulation means is too high or too low. If the frequency is too high, the high amplitude pulse occurs before the phase switches and if the frequency is too low then the high amplitude pulse occurs after the phase switches. Thus the relative timing of the pulses indicates whether the dither frequency is too high or too low and the width of the pulse indicates the magnitude of the mis-match.

Preferably, said means for comparing the detector output signal with a signal representative of said phase modulation and for adjusting said phase modulation means includes edge sensitive detector means for determining the presence of relatively high amplitude pulses in said intensity signal and for determining the timing of said high amplitude pulses relative to said phase modulation.

It should be noted that when the phase switching means is operating with a half period equivalent to the propagation time of the optical fibre then the half period of the phase switching means is indictive of the length of the fibre. In one arrangement, a signal representative of the half period is used to adjust the scale factor of the fibre optic gyroscope thus to stabilise it against changes in length.

Further aspects of the invention will be apparent from the following description which is by way of example only and in which reference will be made to the accompanying drawings, in which.

Figure 1:
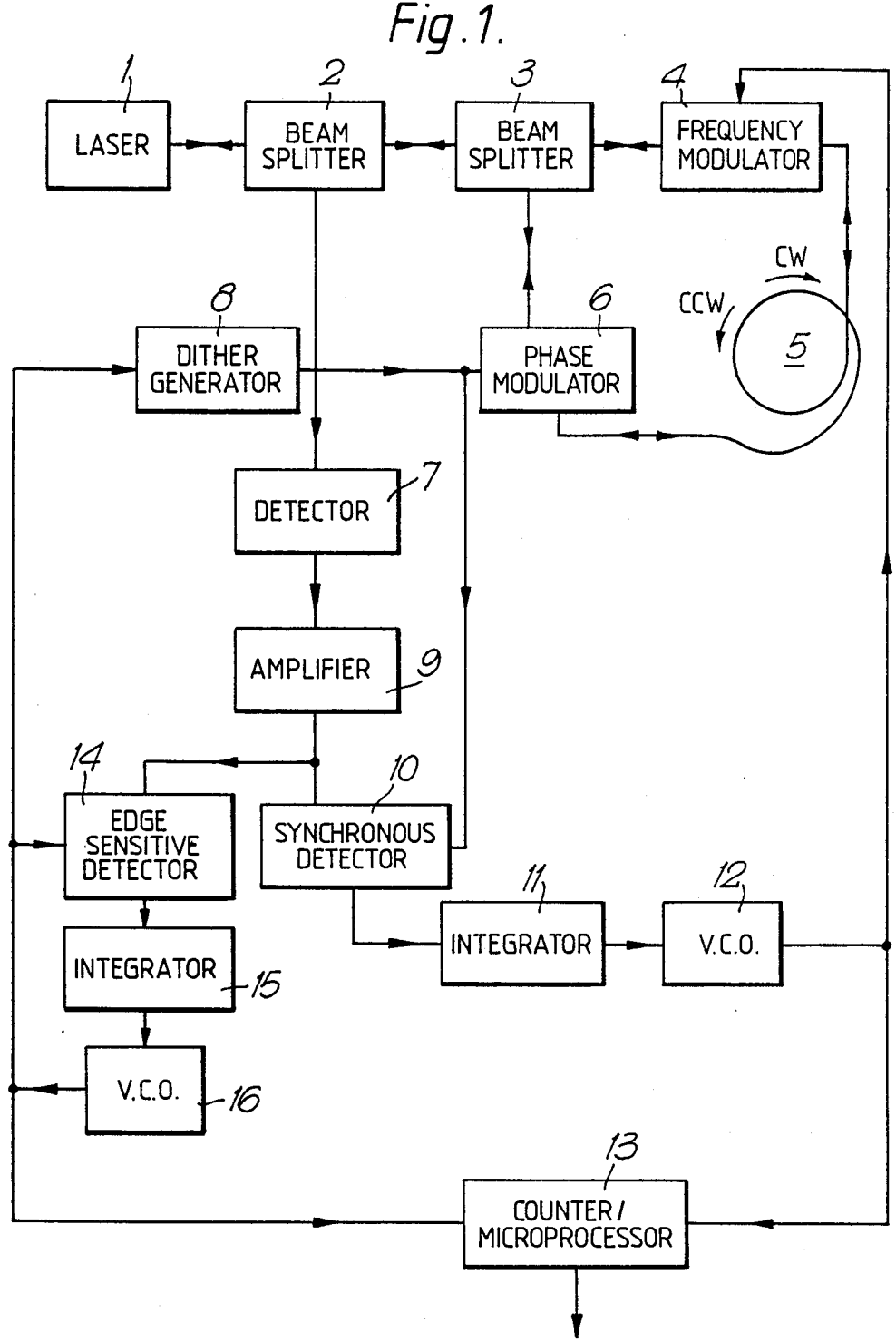
FIG. 1 is a schematic diagram of an embodiment of fibre optic gyroscope constructed in accordance with this invention.

Referring initially to FIG. 1, the fibre optic gyroscope comprises a laser light source 1 which directs a beam of radiation via beam splitter 2 to beam splitter 3 where it is split into clockwise and counter clockwise component beams CW and CCW respectively. The clockwise component beam is passed via a frequency modulator 4 into a multi turn coil 5 of optical fibre. After leaving the coil 5 the clockwise beam passes through a phase modultor 6 and returns to the beam splitter 3. The counter clockwise beam passes from beam splitter 3 to the phase modulator 6 then into coil 5 and on leaving the coil passes through frequency modulator 4 thence to beam splitter 3 where it is combined with the clockwise beam. The recombined beam then passes to beam splitter 2 where it is deflected onto an optical detector 7 which outputs a signal representing the intensity of the recombined beam.

Figure 2:
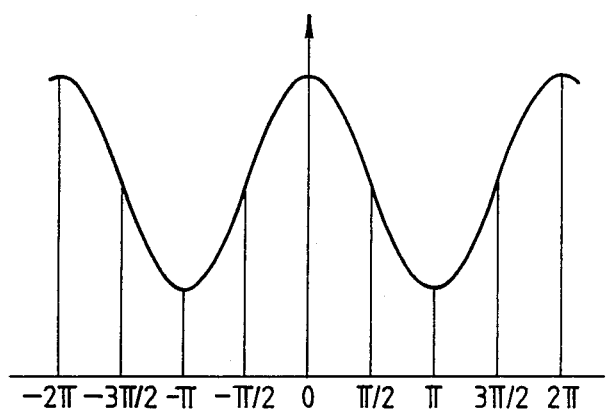
FIG. 2 is a diagram representing intensity versus relative phase difference for the gyroscope of FIG. 1, and FIGS. 3a, 3b and 3c are diagrams respresenting driving and response wave forms for the gyroscope fo FIG. 1 in three different conditions.

The gyroscope is set up to that in the absence of any applied rotation the clockwise and counter clockwise beams would constructively interfere at the zero order fringe (zero relative phase difference see FIG. 2). On rotation of the coil, a non-reciprocal phase shift is imparted between the clockwise and counter clockwise beams by virtur of the Sagnac effect which causes a fringe shift which varies the intensity of the recombined beam detected by the optical detector 7. In order to detect the magnitude and direction of the fringe shift and to make the gyroscope operate at the most sensitive portion of the intensity versus phase difference curve, a ±Pi/2 phase difference is applied between the clockwise and counter clockwise beams by means of phase modulator 6 which is intended to apply a switching dither of ±Pi/4 with a half period equal to the time taken for one beam to propagate around the coil 5 thereby to effect the dither which biases the output beam to ±Pi/2. The phase modulator is driven by a phase dither generator 8.

The output from the detector 7 is amplified by amplifier 9 and supplied together with a signal from the phase dither generator 8, to a synchronous detector 10, to demodulate the output from the detector. The synchronous detector 10 outputs a signal indicative of the magnitude of the direction of the fringe shift which is then integrated by integrator 11 and fed to a voltage controlled oscillator 12 to drive the frequency modulator 4 to generate a non-reciprocal phase shift between the clockwise and counter clockwise beams which is sufficient to null the Sagnac induced phase shift. The frequency (f) necessary to null the fringe shift is directly proportional to the applied rotation (W) by the following relationship:

$$f = S.W$$

where S is the optical scale factor and is dependant upon the length of the fibre in the coil.

The output from the voltage controlled oscillator 12 is supplied to a counter/microprocessor 13 to be processed to determine the magnitude and direction of the rotation applied to the coil.

Figure 3A:
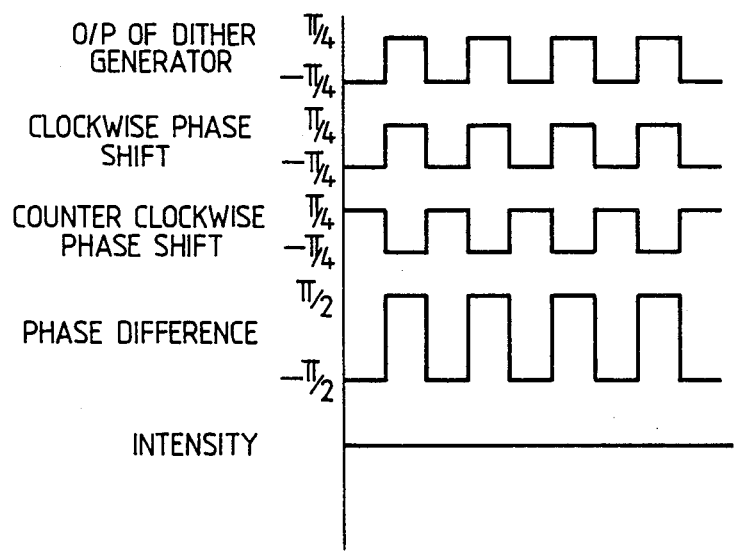

Up to this point, the embodiment of gyroscope as described generally follow existing principles for example, those disclosed in U.S. Pat. No. 4,299,490. As to be described below, the gyroscope has however been modified to create a control loop which ensures that the ±Pi/4 dither is synchronised with the propagation time of the coil. Reference is now made to FIG. 3 of the drawings. FIG. 3a illustrates the output of the dither generator 8; the phase modulations of the clockwise and counter clockwise beams as seen at the detector 7; the relative phase difference of the beams at the detector, and the intensity observed by the detector when the coil is at reat and when the time taken for one beam to propagate around the coil is equivalent to one half the period (P) of the wave from driving the phase dither generator. It will be seen that the intensity observed by the detector is at a constant level corresponding to a ±Pi/2 phase difference (see FIG. 2).

Figure 3B:
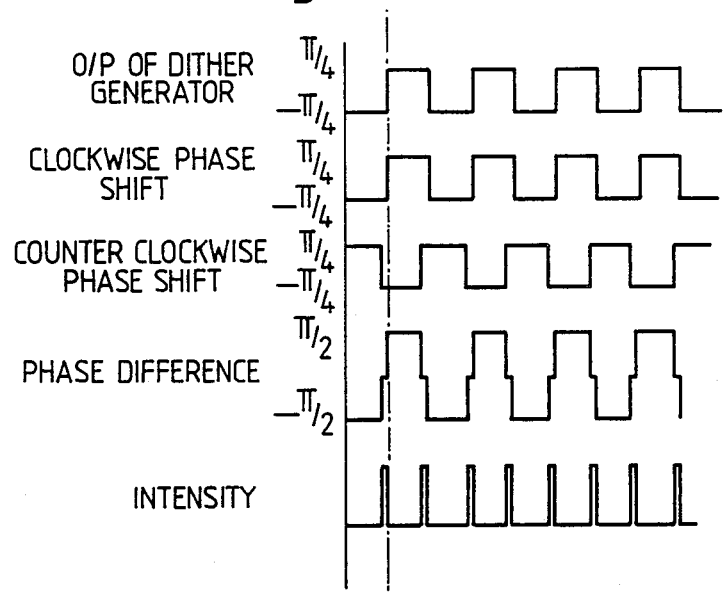

FIG. 3b illustrates the case where the propagation period is less than one half the period of the driving wave form (i.e. the dither frequency is to low). Transients arise in the output observed by the detector because light passing through the phase shifter 6 with the same phase shift in both directions of propagation interferes fully constructively. In this case the full amplitude interference occurs before the ouput from the dither generator switches and terminates at the time of switching.

Figure 3C:
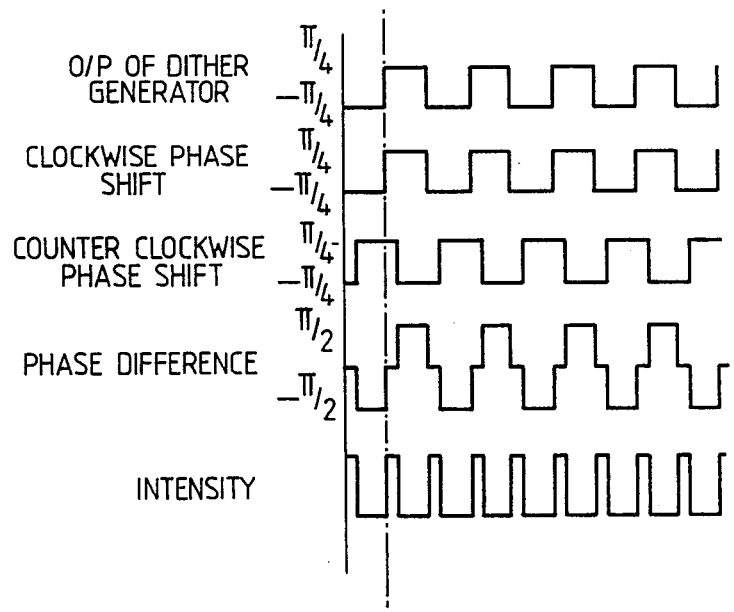

FIG. 3c illustrates the case where the propagation time is greater than the half period where it will be seen that the full amplitude interference starts as the output from the dither generator switches and lasts for the difference in the duratio of the difference in timing.

It should be noted that the transient pulses arising from the timing errors are of large amplitude and short duration as compared with the normal AC signal which arises from the Sagnac effect. An edge sensitive detector 14 is supplied with an amplified intensity signal from amplifier 9 and with the input to the dither generator 8 and produces an output voltage which depends on both whether any transients in the intensity signal are early or late as compared with the switching of the phase dither and on the duration of the transient pulses. The output signals from the edge sensitive detector 14 are integrated in integrator 15 whose output drives the voltage controlled oscillator 16 which controls the dither generator 8 thus to lock the half period of the voltage controlled oscillator 16 to the loop propagation time. A counter which forms part of the counter/micro processor module 13 holds a measure of the period and hence the loop time, and the contents of the counter are sampled by the microprocessor to enable appropriate corrections to be made to the scale factor of the gyroscope on a continuous basis.

The embodiment of gyroscope described above is thus adapted to allow synchronisation of the half period of the switching dither with the propagation time of the loop and also to allow continuous measurement of the fibre in the coil and thus continuous stabilisation of the scale factor against the changes in length of the coil.

We claim:

1. A fibre optic gyroscope including:
   a length of optical fibre,
   a light source for being divided into a least two component beams for being propagated in opposed directions through said fibre,
   means for re-combining said component beams to form an output optial beam when said component beams have left the optical fibre,
   detector means for detecting said output optical beam and producing a signal indicative of the intensity thereof,
   phase modulating means for applying a switched phase modulation in the optical fibre path for alternating periods,
   means for comparing the detector output signal with a signal representative of said phase modulation and for adjusting said phase modulating means to synchronise the phase modulation with the propagation time of light along said length of optical fibre.

2. A fibre optic gyroscope according to claim 1, wherein said means for comparing the detector output signal with a signal representative of phase modulation and for adjusting said phase modulation means includes edge sensitive detector means for determining the present of relatively high amplitude pulses in said intensity signal and for determining the timing of said high amplitude pulses relative to said phase modulation.

* * * * *